United States Patent
Lindqvist et al.

(10) Patent No.: US 9,876,540 B2
(45) Date of Patent: Jan. 23, 2018

(54) INTERFERENCE ALIGNMENT BASED PRECODING METHOD FOR REDUCING BANDWIDTH OF THE BACKHAUL NETWORK

(71) Applicant: Telefonaktiebolaget L M Ericsson (publ), Stockholm (SE)

(72) Inventors: Fredrik Lindqvist, Järfälla (SE); Maxime Guillaud, Vienna (AT); Mohsen Rezaeekheirabadi, Vienna (AT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 253 days.

(21) Appl. No.: 14/760,387

(22) PCT Filed: Feb. 21, 2013

(86) PCT No.: PCT/SE2013/050150
§ 371 (c)(1),
(2) Date: Jul. 10, 2015

(87) PCT Pub. No.: WO2014/109682
PCT Pub. Date: Jul. 17, 2014

(65) Prior Publication Data
US 2015/0358057 A1 Dec. 10, 2015

Related U.S. Application Data

(60) Provisional application No. 61/751,288, filed on Jan. 11, 2013, provisional application No. 61/751,974, filed on Jan. 14, 2013.

(51) Int. Cl.
*H04B 1/38* (2015.01)
*H04B 7/024* (2017.01)
(Continued)

(52) U.S. Cl.
CPC .......... *H04B 7/024* (2013.01); *H04B 7/0456* (2013.01); *H04B 7/0626* (2013.01);
(Continued)

(58) Field of Classification Search
CPC ......... H04L 5/0035; H04B 1/38; H04B 7/024; H04B 7/0456; H04B 7/0626
See application file for complete search history.

(56) References Cited

U.S. PATENT DOCUMENTS 5,887,027 A * 3/1999 Cohen ................. H04L 25/0212
375/222
2009/0110033 A1 * 4/2009 Shattil ................. H04B 1/7174
375/141

(Continued)

FOREIGN PATENT DOCUMENTS

EP 2448136 A1 5/2012

OTHER PUBLICATIONS

Cadambe, Viveck et al., "Interference Alignment and Degrees of Freedom of the K-User Interference Channel", IEEE Transactions on Information Theory, vol. 54, No. 8, Aug. 2008, 3425-3441.

(Continued)

*Primary Examiner* — Wei Zhao
(74) *Attorney, Agent, or Firm* — Murphy, Bilak & Homiller, PLLC (57) ABSTRACT

A method and a first radio node for determining a first precoder to be used by the first radio node for sending a transmission to a second radio node. The first radio node measures a set of cross-channel responses. The first radio node encodes the set of cross-channel responses into a first code-book index using a quantization scheme. The first radio node sends the first code-book index to a central unit. The first radio node receives a second code-book index from the central unit. The first radio node obtains a second precoder (Continued)

by decoding the second code-book index. The first radio node determines the first precoder by compensating the second precoder while taking the quantization scheme and the co-operative interference mitigation scheme into account. The first radio node applies the first precoder to the transmission, to be sent by the first radio node, to the second radio node.

20 Claims, 5 Drawing Sheets (51) Int. Cl.
*H04W 72/04* (2009.01)
*H04B 7/0456* (2017.01)
*H04B 7/06* (2006.01)
*H04L 5/14* (2006.01)
*H04L 25/03* (2006.01)
*H04L 5/00* (2006.01)

(52) U.S. Cl.
CPC .......... *H04L 5/0035* (2013.01); *H04L 5/1469* (2013.01); *H04L 25/03904* (2013.01); *H04L 25/03949* (2013.01); *H04W 72/0406* (2013.01)

(56) References Cited

U.S. PATENT DOCUMENTS

2011/0235599 A1\* 9/2011 Nam ..................... H04L 1/0027
370/329
2012/0195219 A1 8/2012 Ko et al.

OTHER PUBLICATIONS

Jindal, Nihar, "MIMO Broadcast Channels With Finite-Rate Feedback", IEEE Transactions on Information Theory, vol. 52, No. 11, Nov. 2006, 5045-5060.
Krishnamachari, Rajesh et al., "Interference Alignment Under Limited Feedback for MIMO Interference Channels", IEEE ISIT, Jun. 13-18, 2010, 619-623.
Rezaee, Mohsen et al., "Limited Feedback for Interference Alignment in the K-user MIMO Interference Channel", IEEE Information Theory Workshop, Sep. 2012, 667-661.
Thukral, Jatin et al., "Interference Alignment with Limited Feedback", IEEE ISIT, Jun. 2009, 1-5.
Tresch, Roland et al., "Cellular Interference Alignment with Imperfect Channel Knowledge", IEEE International Conference on Communications, Jun. 2009, 1-5.
Wiroonsak, Santipach, "Capacity of a Multiple-Antenna Fading Channel With a Quantized Precoding Matrix", IEEE Transactions on Information Theory, vol. 55, No. 3, Mar. 2009, 1-17.

\* cited by examiner

INTERFERENCE ALIGNMENT BASED PRECODING METHOD FOR REDUCING BANDWIDTH OF THE BACKHAUL NETWORK

TECHNICAL FIELD

Embodiments herein relate to radio communication systems, such as telecommunication systems. In particular, a first radio node and a method for determining a first precoder to be used by the first radio node for sending a transmission to a second radio node are disclosed.

BACKGROUND

In the field of radio communication in telecommunication networks, interference alignment (IA) is a recently developed precoder technology, which provides significant gains in interference channels compared to conventional orthogonal medium-sharing methods. A few known precoder technologies are discussed in "Interference alignment and degrees of freedom of the K user interference channel", to V. Cadambe and S. A. Jafar, published in IEEE Transactions on Information Theory, vol. 54, No. 8, p. 3425-3441 in August, 2008. However, implementation of interference alignment methods in existing systems faces a lot of challenges. The necessity of channel knowledge at the transmitters is one of the major issues. This is not practical to achieve in many situations. Moreover, the accuracy of channel state information (CSI) provided to the transmitters should increase as the power increases in order to guarantee the Degrees of Freedom (DoF) gains promised by interference alignment. Therefore, transmission systems which acquire the CSI through feedback from a signal receiving node, such as Frequency Division Duplex (FDD) systems, become less favourable for implementation of interference alignment since potential gains of interference alignment appear at high powers.

For Time Division Duplex (TDD) systems, every base station (BS) can estimate its downlink channels from the uplink transmission phase due to the assumed reciprocity of the channels, i.e. the interference is assumed to be similar in uplink and downlink. However, since interference alignment requires global CSI, which will be explained in section "IA precoding schemes" below, the base stations need to quantize the measured CSI and to share it with other base stations. The CSI may be shared with a central unit in charge of interference management. The measured CSI is usually sent on backhaul links. These backhaul links have limited capacity and hence should be exploited efficiently when sharing the CSI. Since there is typically a significant amount of CSI to share, a code-book based system is used to quantize the CSI into a code-book based CSI to reduce the amount of bits to send. With the code-book based CSI, each BS has knowledge of the code-book a priori and the complete CSI information is represented and conveyed in terms of a code-book index. The efficiency of the code-book system typically depends on how the code-book based CSI has been quantized.

IA Preceding Schemes

In the literature, several IA precoding schemes have been proposed that exploit one or several of the orthogonal dimensions time/frequency/space.

Figure 1:
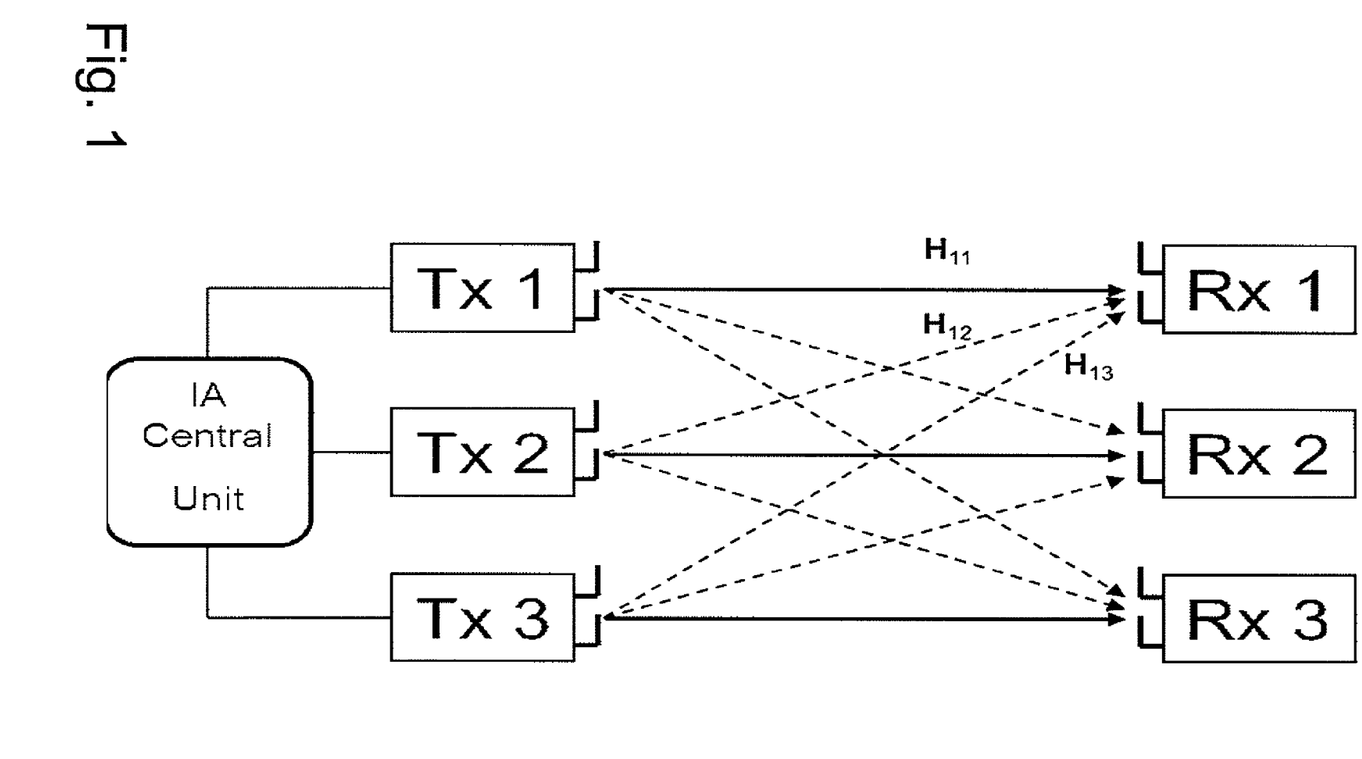
FIG. 1 is a block diagram illustrating an exemplifying radio communication system.

FIG. 1 illustrates downlink, or uplink, spatial IA for MIMO interference channel with K=3 transmitter-receiver pairs. The base stations, shown as Tx, are connected via backhaul links to a IA central unit, where three corresponding IA precoders $V_1$, $V_2$, $V_3$ are calculated. Each node, i.e. transmitter and receiver, is equipped with M number of transmit antennas and N number of receive antennas. Let $H_{nm}$ denote the channel from transmitter m to receiver n. Moreover, for the symmetric setup where M=N, each transmitter can send at most M/2 spatial information streams and simultaneously align the interference at the receivers within the remaining M/2 dimensions. As shown in "Interference alignment and degrees of freedom of the K user interference channel", mentioned above, a first IA precoder $V_1$ can for this particular case be found as the solution to the following eigenvalue problem:

$$V_1 = (H_{31})^{-1} H_{32} (H_{12})^{-1} H_{13} (H_{23})^{-1} H_{21} V_1. \quad \text{(Eq. 1)}$$

where the remaining two precoders $V_2$, $V_3$ are obtained from the relations $$V_2 = (H_{32})^{-1} H_{31} V_1 \text{ and } V_3 = (H_{23})^{-1} H_{21} V_1. \quad \text{(Eq. 2)}$$

It can be seen from (Eq. 1) and (Eq. 2) that only the cross channels, $H_{nm}$, m≠n, are required at the IA central unit, which is responsible for the IA precoder calculation. How to practically obtain this channel information in an efficient way is a non-trivial system design issue which is discussed briefly in the following.

We distinguish between interference alignment (IA) for the downlink, where the IA precoders are employed at the base stations, or the transmitters (Tx), and IA for the uplink, where the precoders are employed at the mobile stations (MSs), or the receivers (Rx).

Firstly, considering IA for the downlink, the mobile stations first transmit orthogonal pilots to allow the base stations to measure all uplink (UL) direct- and cross-channels between the mobile stations and the base stations, i.e. $H_{nm}$. By assuming channel reciprocity, which essentially limits the scheme to time division duplex (TDD), the measured uplink channels provide estimates for the corresponding downlink channels. These estimates are sent to the IA central unit that calculates the precoders e.g. via (Eq. 1) and (Eq. 2). The obtained precoders are then sent to their respective base stations and subsequently used at a predetermined time instant with known DL pilots to allow the kth MS to estimate the effective channel, $H_{kk} V_k$, and an appropriate receiver filter as shown in the above mentioned "Interference alignment with non-ideal CSI". Note that the described scheme does not require any explicit CSI feedback from the mobile stations in addition to the transmitted pilots. However, in case the channel reciprocity assumption does not hold, the mobile stations are required to estimate and feedback the downlink cross-channels, i.e. CSI, to the IA central unit.

Secondly, IA for the uplink is similar to IA for the downlink in terms of estimated quantities. A difference, at least from a practical point of view, is the required communication between the mobile stations needed to convey the channel estimates and the calculated precoders. For this reason, the IA for the downlink is probably more practical to determine with current system design considerations.

Few works have investigated how to efficiently share CSI on capacity-limited backhaul links targeting downlink closed-form IA with requirement of acquiring global CSI. However, there has been extensive research concentrated on limited feedback from receivers to the transmitters. In those scenarios where the receivers quantize and feedback the CSI to the transmitters, the problem is explored over frequency selective channels for single-antenna users, as in "Interference alignment with limited feedback" to J. Thukral and H. Bolcskei, published in Proc. IEEE Int. Symp. Information Theory (ISIT), Seoul, date June 2009, and for multiple-antenna users, as in "Interference alignment under limited feedback for MIMO interference channels", to R. T. Krishnamachari and M. K. Varanasi, published in Proc. IEEE Int. Symp. Information Theory (ISIT), Austin, Tex., in June 2010. These papers provide "Degrees of Freedom"-achieving quantization schemes and study the required scaling of the number of feedback bits. For arbitrary channel coefficients in MIMO IC, as in "Limited feedback for interference alignment in the k-user MIMO interference channel", to M. Rezaee and M. Guillaud, published in Proc. IEEE Inf. Theory. Workshop (ITW), Lausanne, provides the best currently known scaling of feedback bits to achieve IA. For broadcast channel, the scaling of the feedback bits was characterized in "MIMO broadcast channels with finite-rate feedback", to N. Jindal, published in IEEE Trans. Inf. Theory, vol. 52, no. 11, pp. 5045-5060, in November 2006. Quantization of the precoding matrix using a Random Vector Quantization (RVQ) codebooks is investigated in "Capacity of a multiple-antenna fading channel with a quantized precoding matrix", to W. Santipach and M. L. Honig, published in IEEE Trans. Inf. Theory, vol. 55, no. 3, pp. 1218-1234, March 2009. This paper provides insights on the asymptotic optimality of RVQ codebooks. From another point of view, as in "Cellular interference alignment with imperfect channel knowledge", to Roland Tresch and Maxime Guillaud, published in Proc. IEEE International Conference on Communications (ICC), Dresden, Germany, date June 2009, an analysis of the effect of imperfect CSI on the mutual information of the interference alignment scheme is provided.

Existing interference alignment solutions for TDD typically calculate the IA precoders based on measured CSI in for example the uplink. As channel reciprocity is assumed, the measured CSI corresponds to the downlink as well. The so obtained CSI is quantized at each respective node before sending the quantized CSI to the IA central unit, e.g. a coordinating BS for downlink IA or a coordinating MS for uplink IA.

Some efficient code-book based CSI method exploit Grassmannian subspace packing. These methods avoid the typically less efficient direct quantization of the CSI. Instead, a transformed representation of the interfering channels at the receiver is quantized and represented by a code-book index. This is applicable when the receiver can convey the CSI over a feedback-link to the IA central unit. However, for interference alignment with TDD and no feedback-link for the CSI, this solution cannot be applied since the measured cross-channels are not the required ones, i.e., the set of outgoing cross-channels at the Tx side is different from the set of incoming cross-channels at the Rx side. A disadvantage is that the CSI feedback consumes resources of the feedback-link, which typically is a scarce radio interface between the BS and MS.

SUMMARY

An object is to improve performance of a telecommunication system.

According to an aspect, the object is achieved by a method, performed by a first radio node, for determining a first precoder to be used by the first radio node for sending a transmission to a second radio node. The first radio node measures, by the first radio node, a set of cross-channel responses. A respective cross-channel response of the set of cross-channel responses is associated with a respective third radio node of a set of third radio nodes. Next, the first radio node quantizes and encodes the set of cross-channel responses into a first code-book index using a quantization scheme. The first radio node sends the first code-book index to a central unit, whereby the central unit is able to generate a second code-book index based on the first code-book index and a co-operative interference mitigation scheme, wherein the second code-book index represents a second precoder. Moreover, the first radio node receives the second code-book index from the central unit. The first radio node obtains the second precoder by decoding the second code-book index. The first radio node determines the first precoder by compensating the second precoder while taking the quantization scheme and the co-operative interference mitigation scheme into account. Furthermore, the first radio node applies the first precoder to the transmission, to be sent by the first radio node to the second radio node.

According to another aspect, the object is achieved by a first radio node configured to determine a first precoder to be used by the first radio node for sending a transmission to a second radio node. The first radio node comprises a processing circuit configured to measure a set of cross-channel responses. A respective cross-channel response of the set of cross-channel responses is associated with a respective third radio node of a set of third radio nodes. The processing circuit is further configured to quantize and encode the set of cross-channel responses into a first code-book index using a quantization scheme, and to send the first code-book index to a central unit. In this manner, the central unit is able to generate a second code-book index based on the first code-book index and a co-operative interference mitigation scheme. The second code-book index represents a second precoder. The processing circuit is further configured to receive the second code-book index from the central unit, and to obtain the second precoder by decoding the second code-book index. Furthermore, the processing circuit is configured to determine the first precoder by compensating the second precoder while taking the quantization scheme and the co-operative interference mitigation scheme into account. Moreover, the processing circuit is configured to apply the first precoder to the transmission, to be sent by the first radio node to the second radio node.

Advantageously, a precoder is provided to the first radio node while reducing signalling over backhaul links as well as reducing signalling over a radio interface between, e.g. the first radio node, such as a base station, and a mobile station. Backhaul links may be links between transmitters and the central unit as shown in FIG. 1. Therefore, some embodiments herein may be used to improve co-operative interference mitigation schemes.

The above mentioned object is achieved by the embodiments herein thanks to a quantization scheme which reduces the amount of information exchanged over the radio interface as compared to conventional methods required for e.g. IA in a TDD transmission system. The cross-channel responses are processed, e.g. quantized, locally at the radio node where available, to extract the characteristics relevant to interference mitigation. The cross-channel responses can then be shared between the radio nodes in a more compressed representation. When the radio node receives, from e.g. the central unit, the respective precoder, the radio node compensates for the locally performed quantization to obtain a co-operative precoder. Thus, the radio node adjusts the precoder received from the central unit by use of knowledge of the co-operative interference mitigation scheme employed by the central unit.

In some examples, the cross-channel response may be given by a CSI representation. The CSI representation according to embodiments herein carries sufficient information to let a central unit evaluate how much the signals from multiple transmitters will interfere with each other at the receivers, without requiring the full channel state information.

BRIEF DESCRIPTION OF THE DRAWINGS

The various aspects of embodiments disclosed herein, including particular features and advantages thereof, will be readily understood from the following detailed description and the drawings included herein.

DETAILED DESCRIPTION

Throughout the following description similar reference numerals have been used to denote similar elements, network nodes, parts, items or features, when applicable.

Figure 2:
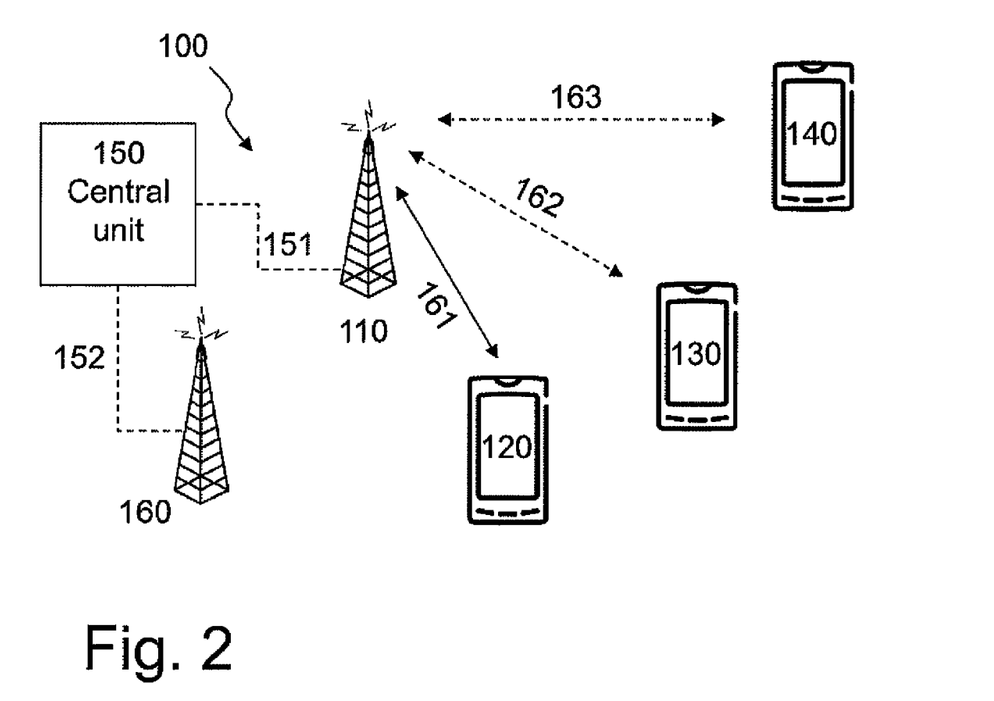
FIG. 2 is a schematic overview illustrating embodiments in an exemplifying wireless communication system.

FIG. 2 depicts an exemplifying radio communications system 100 in which embodiments herein may be implemented. In this example, the radio communications system 100 is a Long Term Evolution (LTE) system.

The radio communication system 100 comprises a first radio node 110. In this example, the radio node 110 is a radio base station. As used herein, the term "radio node" may refer to a radio network node, an evolved Node B (eNB), a control node controlling one or more Remote Radio Units (RRUs), a radio base station, a transmitter, a transmitter side, an access point or the like. The radio node 110 may implement evolved UMTS Terrestrial Radio Access Network (E-UTRAN) technologies, where UTMS is short for Universal Mobile Telecommunications System.

Furthermore, a second radio node 120 is located in the vicinity of the first radio node 110. In this example, the second radio node 120 is a user equipment 120. The user equipment 120 may communicate via a radio interface 161 with the first radio node 110. As used herein, the term "user equipment" may refer to a mobile phone, a mobile station, a cellular phone, a Personal Digital Assistant (PDA) equipped with radio communication capabilities, a receiver, a mobile station (MS), a smartphone, a laptop or personal computer (PC) equipped with an internal or external mobile broadband modem, a printer, a tablet PC with radio communication capabilities, a portable electronic radio communication device, a sensor device equipped with radio communication capabilities or the like. The sensor may be any kind of weather sensor, such as wind, temperature, air pressure, humidity etc. As further examples, the sensor may be a light sensor, an electronic switch, a microphone, a loudspeaker, a camera sensor etc.

Moreover, provided purely as examples of the third set of radio nodes, a further user equipment 130 and a still further user equipment 140 are shown in FIG. 2. These user equipments 130, 140 may also be located in the vicinity of the first radio node 110.

A channel response measured on the radio interface 161 may be referred to as a direct channel response.

In contrast, for the user equipments 130, 140, a respective cross-channel response over radio interfaces 162, 163 may be measured by the first radio node 110.

A central unit 150 may be connected, via a backhaul link 151, to the radio node 110. As used herein, the term "backhaul link" may be a wired or a wireless connection.

Furthermore, a fourth radio node 160 may also be connected to the central unit 150 via a backhaul link 152. In this example, the fourth radio node 160 is a a radio base station or the like according to the examples above.

Figure 3:
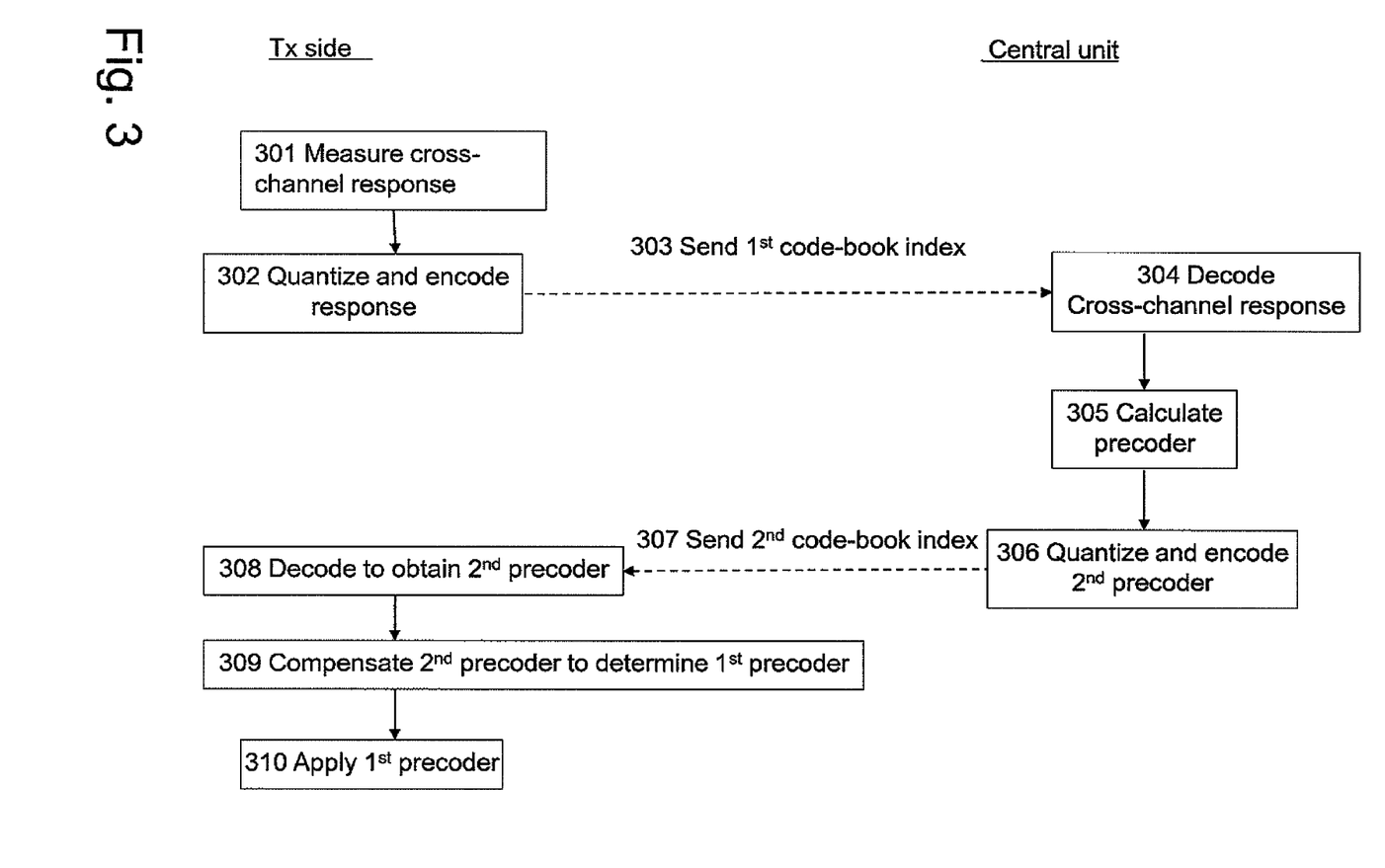
FIG. 3 is a combined signaling scheme and flowchart illustrating embodiments of the method.

FIG. 3 illustrates an exemplifying method for determining a first precoder to be used by the first radio node 110 for sending a transmission to a second radio node 120. This may mean that the first radio node 110 applies the first precoder before, or when, sending the transmission to the second radio node 120. This exemplifying method may be implemented in the radio communication system 100 of FIG. 2. In this method, the first radio node 110 may be a base station sending a downlink transmission to the second radio node 120 being a user equipment, or vice versa. Thus, the first radio node 110 performs a method for determining the first precoder to be used by the first radio node 110 for sending a transmission to a second radio node 120. In this example, TDD and channel reciprocity may be assumed for the radio communication system 100. Note that the exemplifying method may be used with IA precoders for the downlink. In combination therewith or alternatively, the method may be used with other CSI-based precoder methods, such as zero-forcing precoders, coordinated multi-point (CoMP). In further examples, other joint-transmission schemes than CoMP may be applied.

However, the method could equivalently be applied for uplink precoding with TDD, by assuming existing backhaul links, or another transmission medium, between the mobile stations (MS), denoted Rx in FIG. 1. The method disclosed herein may be applied in a more general CSI-based precoding system relying on global knowledge about cross-channel responses, such as in the form of CSI. Thus, the methods disclosed herein may be applied for downlink and/or uplink precoding with TDD and channel reciprocity. It shall be noted that the term "radio node" is intended to describe a node determining either uplink or downlink precoding. Hence, in its most general sense the term "radio node" may be any radio communication device including, but not limited to, the examples mentioned above concerning the terms "radio node" as well as "user equipment".

Some embodiments herein exploits so called invariances w.r.t. CSI which can be found in an interference alignment formulation and quantizes the subspace of the cross-channels measured at each Tx, i.e., at each BS for downlink IA or at each MS for uplink IA. This subspace is represented by a code-book index which is sent from each respective Tx to the IA central unit. The IA central unit decodes the CSI with the help of the a priori known code-book. Based on this, the IA precoders are calculated by the IA central unit, e.g. via (Eq. 1) and (Eq. 2) above, and then quantized and mapped to a codebook index before being sent to respective Tx. The Tx decodes the received code-book index to obtain the precoders. However, before deploying the precoders each respective Tx has to adjust the precoders to compensate for using the subspace of the cross-channels at the Tx side (rather than the cross-channels as the Rx side), as explained in more details herein.

The following actions may be performed in any suitable order.

Action 301

In order for the first radio node 110 to obtain knowledge about a respective channel response associated with a respective third radio node of a set of third radio nodes 130, 140, the first radio node 110 measures a set of cross-channel responses. Hence, the set of cross-channel responses are measured by the first radio node 110.

In some examples, the first radio node 110 is referred to as the transmitter, or the transmitter side, "Tx side", which may be a radio network node or user equipment. Throughout the text in relation to FIG. 3, this example is referred to as the transmitter-receiver-example. Then, the transmitter measures a cross-channel response for example on pilot signals sent from a receiver. The cross-channel response may be CSI. The cross-channel response $H_{ij}$ for each of the receivers Rx may be measured. Furthermore, the method illustrated with reference to FIG. 3 may, hence, be equally applicable to the transmitter-receiver pairs illustrated in FIG. 1.

Action 302

In order to efficiently transfer the set of cross-channel responses, the first radio node 110 quantizes and encodes the set of cross-channel responses into a first code-book index using a quantization scheme. The quantization scheme may be based on Grassmann manifold quantization. The encoding may be based on a column space of a matrix comprising the respective cross-channel responses. As an example, the respective cross-channel responses may be concatenated, such as vertically concatenated, into the matrix. The matrix may further comprise a block representing a direct channel response, wherein the direct channel response is associated to a channel for carrying the transmission between the first and second radio node 110, 120. As used herein, the term "block" may refer to an array of values, such as a row or column vector, or a set of rows or a set of columns according to mathematical terminology.

Figure 4:
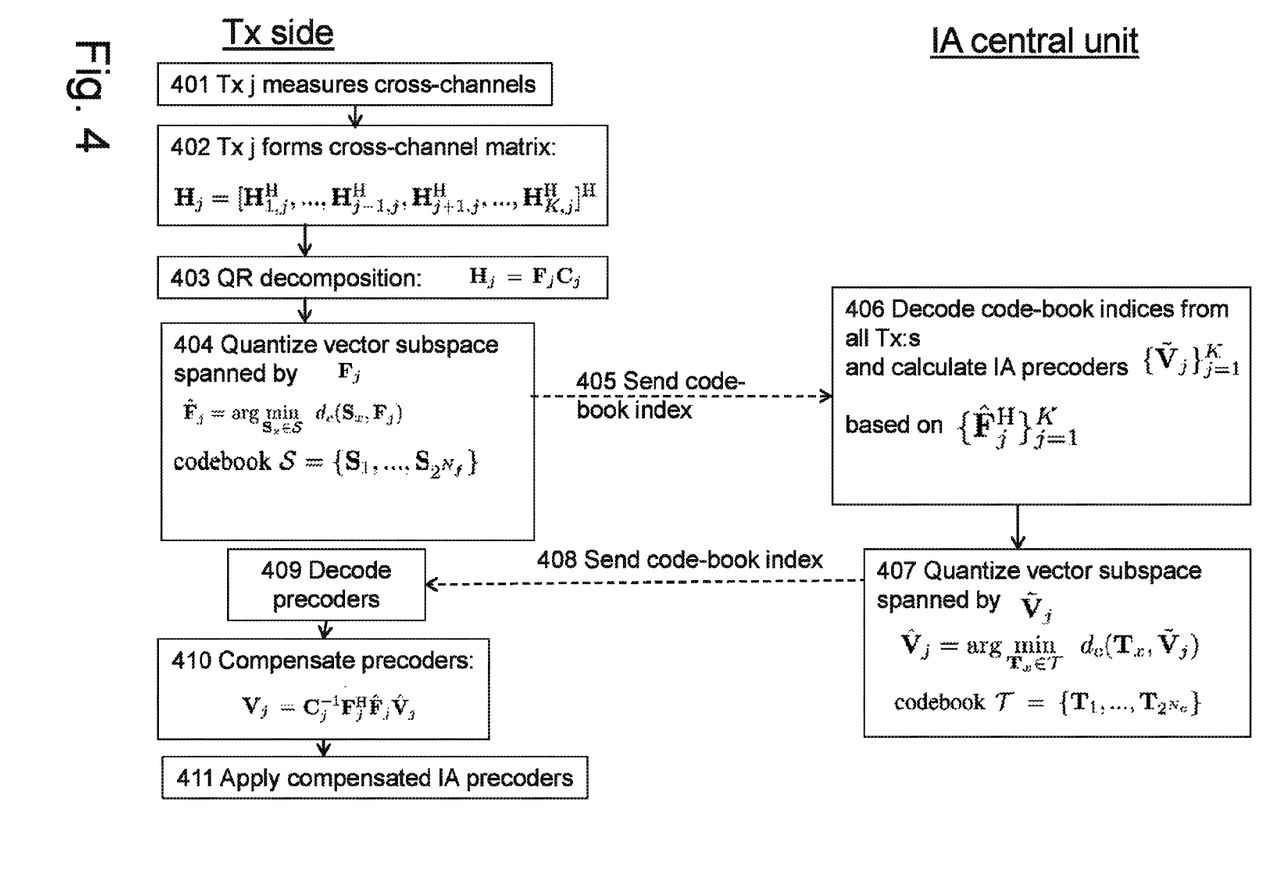
FIG. 4 is a combined signaling scheme and flowchart illustrating further embodiments of the method.

An exemplifying matrix $H_j$ is given by:

$$H_j = [H_{1,j}^H, \ldots, H_{j-1,j}^H, H_{j+1,j}^H, \ldots, H_{K,j}^H]^H,$$

where K denotes a number of receivers, e.g. user equipments. With this example, it is shown how the column space of $H_j$ depends on, and can be calculated from, the respective cross-channel responses. See also action 402 in FIG. 4. Superscript "H" denotes the hermitian transpose operation, i.e. complex conjugate operation.

In the transmitter-receiver-example, the transmitter quantizes and encodes the set of cross-channel responses. The set of cross-channel responses may be encoded into for example a first chosen code-book index, or first code-book index for short. The first chosen code-book index may relate to the $H_j$. The first chosen code-book index may represent $F_j$ by QR-decomposition of the $H_j$. See also FIG. 4 below. In other examples, singular value decomposition (SVD), or a similar decomposition, may be used.

The notion "first code-book index" is used merely to distinguish this code-book index from the code-book index in action 306, i.e. a second code-book index for short. These notions should not be confused with the first and second index numbers in the respective code-books, or the same code-book, such as code-books S and T as mentioned with reference to FIG. 4 below.

Action 303

The first radio node 110 sends the first code-book index to a central unit 150, whereby the central unit 150 is able to generate a second code-book index based on the first code-book index and a co-operative interference mitigation scheme, wherein the second code-book index represents a second precoder. It shall be understood that the central unit 150 may also use information about code-book indices from e.g. the fourth radio node 160 and possibly further existing radio nodes (not shown in FIG. 2).

For the transmitter-receiver-example, the transmitter sends the first chosen code-book index to the central unit.

The transmission of the first code-book index between the first node 110 and the central unit 150 may take place over a wired or over a wireless connection. Generally, any transmission between the first node 110 and the central unit 150 may be over a wired or a wireless connection. Similarly, this applies to action 307 below.

Action 304

The central unit decodes the first code-book index to obtain the cross-channel responses, such as CSI, from all transmitters.

In some embodiments, a channel represented by $H_{i,j}$, referred to as direct-channel response, is included among the matrices representing the interference channel. Based on this information, metrics such as the approximate signal-to-interference ratio can be computed and optimized by the central unit, again without resorting to the full CSI.

Action 305

The central unit calculates the second precoder, such as IA precoders, based on the cross-channel responses.

Action 306

The central unit further encodes the second precoder to a second chosen code-book index. The second code-book index may represent $V_i$. See also FIG. 4.

Action 307

The central unit sends the second chosen code-book index to the radio node 110. The second code-book index may represent $V_i$. This means that the first radio node 110 receives the second code-book index from the central unit 150, whereby the radio node 110 may further process the second code-book index as described in action 308 through 310.

Action 308

The first radio node 110 obtains the second precoder by decoding the second code-book index. At this stage, the second precoder has been determined as if the first precoder sent to the central unit in fact represented cross-channel responses at the receiver side, e.g. as shown by the dashed arrows in FIG. 1.

For the transmitter-receiver-example, the transmitter decodes the second code-book index to obtain precoders.

Action 309

The first radio node 110 determines the first precoder by compensating the second precoder while taking the quantization scheme and the co-operative interference mitigation scheme into account. Now, the compensated second precoder has been adjusted in order to take into account that the first code-book index represented cross-channel response at the radio node 110, i.e. at the transmitter side while using the terms of FIG. 1.

For the transmitter-receiver-example, the transmitter compensates the obtained precoders. This may mean that the precoders obtained in action 208 are transformed into further precoders while for example taking the quantization and/or QR-decomposition into account. See also FIG. 4. In some examples, the compensated precoders are calculated while also taking into account a type of the precoders calculated in action 305. The type of the precoder may be interference alignment precoders.

Action 310

The first radio node 110 applies the first precoder to the transmission, to be sent by the first radio node 110, to the second radio node 120.

For the transmitter-receiver-example, the transmitter applies the precoders, i.e. the compensated precoders from action 309, to its transmissions towards the receivers.

The embodiments disclosed herein allows for a reduction of the bandwidth on the backhaul network (or between the MSs in the uplink case) dedicated to information about cross-channel response, such as CSI information. Alternatively, for a given amount of bandwidth dedicated to CSI sharing, the proposed method achieves a better performance, e.g. in terms of the sum-rate achieved in the network, than existing CSI quantization schemes. The proposed method/scheme can be applied for both downlink and uplink CSI-based spatial IA precoding.

Moreover, the embodiments presented herein may be applied to other systems where signals from a given transmitter are received by multiple receivers. In such a system, any interference management scheme must strike a trade-off between improving the interference situation at one receiver, and worsening the situations for other receivers.

An application of the method to a more general precoding system requiring global CSI may also be feasible. By exploiting TDD and channel reciprocity, no CSI information is required between the BSs and MSs, which saves the scarce radio resources in a wireless system, e.g. radio communication system. The method further targets an efficient utilization of the backhaul links between BSs/MSs and the central unit, such as IA central unit, by quantizing the measured cross-channels at (only) the Tx side. In this way, the precoders can be computed by the central unit without requiring explicit CSI from the receiver side. The proposed code-book based CSI scheme compensates the IA precoders at each Tx node. This means that the central unit does not have to be aware of the details of the method except for the a priori known code-book. This can be an advantage if the method is implemented in an already existing CSI-based precoding system whereby only the BS/MS "quantization software" needs to be changed. Furthermore, the method/scheme can dynamically decide an appropriate number of bits per code-word in order to efficiently use the backhaul link while at the same time avoid being performance limited by multi-user interference stemming from insufficient quantization.

As can be seen from FIG. 3 and FIG. 4 below, the precoders, e.g. IA precoders, may be obtained without using information about the cross-channel response measured at the receiver. Thus, the radio interface between the transmitter and the receiver is off-loaded.

Now turning to FIG. 4, which illustrates a detailed block diagram of the embodiments herein according to the method applied for downlink/uplink IA with TDD and channel reciprocity.

The following actions may be performed in any suitable order.

Action 401

The transmitter, Tx side, measures cross-channels. This means that each transmitter Tx j measures cross-channels. Similarly, through actions 402 to 405 and 409 to 411, the actions described are performed by each transmitter Tx j. This action is similar to action 301.

Action 402

The transmitter, Tx side, forms the above-described cross-channel matrix $H_j$. This action is similar to at least parts of action 302.

Action 403

The transmitter, Tx side, applies QR-decomposition to the matrix $H_j$. This action is similar to at least parts of action 302.

Action 404

The transmitter, Tx side, quantizes vector subspace Fj using a code-book S.

Only the subspace spanned by $H_j$ is encoded, through the use of the chordal distance in this action. This action is similar to at least parts of action 302.

Action 405

The transmitter, Tx side, sends the code-book index obtained in action 404. This action is similar to action 303.

Action 406

The IA central unit decodes the code-book indices from each respective transmitter Tx j. Thus, the central unit obtains global knowledge about cross-channel response. Then, the central unit calculates IA precoders. This action is similar to action 304 and 305.

Action 407

The IA central unit quantizes subspace spanned by IA precoders using a code-book T. This action is similar to action 306.

Action 408

The central unit sends, to the transmitter, the respective IA precoder. This action is similar to action 307.

Action 409

The transmitter, Tx side, decodes the received precoder. This action is similar to action 308.

Action 410

The transmitter, Tx side, compensates the obtained precoder by computing:

$$V_j = C_j^{-1} F_j^H \hat{F}_j \hat{V}_j$$

In this manner, compensated IA precoders are obtained. This action is similar to action 309.

Action 411

The transmitter, Tx side, applies the compensated IA precoder. This action is similar to action 310.

As shown in FIG. 4, the quantizing of vector subspaces is conducted based on a distance-measure between subspaces, denoted by function $d_c(.,.)$ in actions 404 and 407. For example, the chordal distance may be used as the distance-measure. Other distance measures such as the Fubini-Study distance may also be considered.

In another embodiment, the BS/MS for downlink/uplink IA utilizes the described method and decides dynamically the appropriate number of bits per code-word, Nb, based on the transmit power and number of antennas. This can be derived and characterized as:

$$Nb = \alpha M((K-1)N-M)\log P, \quad \text{(Eq. 3)}$$

where P is the transmit power, K is the number of Tx-Rx pairs, M is the number of transmit antennas per node, N is the number of receive antennas per node, and $\alpha$ is a constant proportionality coefficient. Furthermore, the decided Nb would (preferably) be detected/calculated by the decoding node, or (less preferable) conveyed together with the code-word index.

According to some embodiments herein, all the CSI matrices corresponding to interference links originating at a given transmitter j are considered jointly, e.g. Hj in FIG. 4.

The present disclosure further discloses how to dynamically select the level of quantization, i.e., the number of bits, in order to avoid becoming performance limited by the quantization. According to some embodiments herein, it is characterized in Eq. 3 how the required number of bits in the quantization scales with the transmit power and the number of used antennas.

Figure 5:
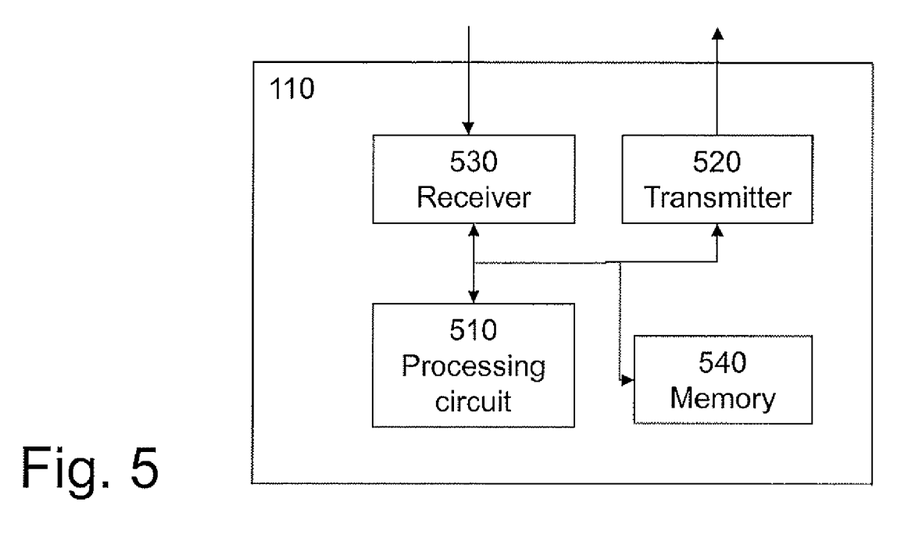
FIG. 5 is a block diagram illustrating embodiments of the radio node.

With reference to FIG. 5, a schematic block diagram of the radio node 110 is shown. The radio node 110 is configured to perform the methods in FIGS. 3 and/or 4. This means that the radio node 110 is configured to determine a first precoder to be used by the first radio node 110 for sending a transmission to a second radio node 120.

The first radio node 110 may be a radio network node or a radio base station. The second radio node 120 may be a user equipment. The central unit 150 may be co-located with the first radio node 110 or with a fourth radio node 160.

The radio node 110 comprises a processing circuit 510 configured to perform the method in FIGS. 3 and/or 4.

Therefore, the processing circuit 510 is configured to measure a set of cross-channel responses. A respective cross-channel response of the set of cross-channel responses is associated with a respective third radio node of a set of third radio nodes 130, 140. As mentioned, the respective cross-channel response may be defined as being a reciprocal cross-channel response.

The processing circuit 510 is further configured to quantize and encode the set of cross-channel responses into a first code-book index using a quantization scheme. The quantization scheme may be based on Grassmann manifold quantization.

The processing circuit 510 may further be configured to encode the set of cross-channel responses based on a column space of a matrix comprising, the respective cross-channel responses.

The matrix may further comprise a block representing a direct channel response, wherein the direct channel response is associated to a channel for carrying the transmission between the first and second radio node 110, 120.

The processing circuit 510 is further configured to send the first code-book index to a central unit 150. In this manner, the central unit 150 is able to generate a second code-book index based on the first code-book index and a co-operative interference mitigation scheme. The co-operative interference mitigation scheme may be interference alignment, zero-forcing or CoMP or the like. The second code-book index represents a second precoder. The processing circuit 510 is further configured to receive the second code-book index from the central unit 150, and to obtain the second precoder by decoding the second code-book index. The first code-book index may relate to a first code-book and the second code-book index relates to a second code book. Furthermore, the processing circuit 510 is configured to determine the first precoder by compensating the second precoder while taking the quantization scheme and the co-operative interference mitigation scheme into account. Moreover, the processing circuit 510 is configured to apply the first precoder to the transmission, to be sent by the first radio node 110, to the second radio node 120.

The processing circuit 510 may be a processing unit, a processor, an application specific integrated circuit (ASIC), a field-programmable gate array (FPGA) or the like. As an example, a processor, an ASIC, an FPGA or the like may comprise one or more processor kernels.

The radio network node 110 further comprises a transmitter 520, which may be configured to send one or more of the numbers, values or parameters described herein. As an example, the transmitter 520 may be configured to send the first code-book index.

The radio network node 110 further comprises a receiver 530, which may be configured to receive one or more of the numbers, values or parameters described herein. As an example, the receiver 530 may be configured to receive the second code-book index.

The radio network node 110 further comprises a memory 540 for storing software to be executed by, for example, the processing circuit. The software may comprise instructions to enable the processing circuit to perform the method in the radio network node 110 as described above in conjunction with FIGS. 2 and/or 3. The memory may be a hard disk, a magnetic storage medium, a portable computer diskette or disc, flash memory, random access memory (RAM) or the like. Furthermore, the memory may be an internal register memory of a processor.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a first radio node, for determining a first precoder to be used by the first radio node for sending a transmission to a second radio node, the method comprising:
   measuring, by the first radio node, a set of cross-channel responses, wherein a respective cross-channel response of the set of cross-channel responses is associated with a respective third radio node of a set of third radio nodes;
   quantizing and encoding the set of cross-channel responses into a first code-book index using a quantization scheme;
   sending the first code-book index to a central unit, whereby the central unit is configured to generate a second code-book index based on the first code-book index and a co-operative interference mitigation scheme, wherein the second code-book index represents a second precoder;
   receiving the second code-book index from the central unit;
   obtaining the second precoder by decoding the second code-book index;
   determining the first precoder by compensating the second precoder while taking the quantization scheme and the co-operative interference mitigation scheme into account; and
   applying the first precoder to the transmission, to be sent by the first radio node, to the second radio node.

2. The method of claim 1, wherein the co-operative interference mitigation scheme is interference alignment.

3. The method of claim 1, wherein the encoding is based on a column space of a matrix comprising, in each block of the matrix, the respective cross-channel response.

4. The method of claim 3, wherein the matrix further comprises a block representing a direct channel response, wherein the direct channel response is associated to a channel for carrying the transmission between the first and second radio node.

5. The method of claim 1, wherein the quantization scheme is based on Grassmann manifold quantization.

6. The method of claim 1, wherein the respective cross-channel response is defined as being a reciprocal cross-channel response.

7. The method of claim 1, wherein the first code-book index relates to a first code-book and the second code-book index relates to a second code book.

8. The method of claim 1, wherein the first radio node is a radio network node or a radio base station.

9. The method of claim 1, wherein the second radio node is a user equipment.

10. The method of claim 1, wherein the central unit is co-located with the first radio node or with a fourth radio node.

11. A first radio node configured to determine a first precoder to be used by the first radio node for sending a transmission to a second radio node, wherein the first radio node comprises:
a processing circuit configured to:
measure a set of cross-channel responses, wherein a respective cross-channel response of the set of cross-channel responses is associated with a respective third radio node of a set of third radio nodes;
quantize and encode the set of cross-channel responses into a first code-book index using a quantization scheme;
send the first code-book index to a central unit, whereby the central unit is configured to generate a second code-book index based on the first code-book index and a co-operative interference mitigation scheme, wherein the second code-book index represents a second precoder;
receive the second code-book index from the central unit;
obtain the second precoder by decoding the second code-book index;
determine the first precoder by compensating the second precoder while taking the quantization scheme and the co-operative interference mitigation scheme into account; and
apply the first precoder to the transmission, to be sent by the first radio node, to the second radio node.

12. The first radio node of claim 11, wherein the co-operative interference mitigation scheme is interference alignment.

13. The first radio node of claim 11, wherein the processing circuit further is configured to encode the set of cross-channel responses based on a column space of a matrix comprising, in each block of the matrix, the respective cross-channel response.

14. The first radio node of claim 13, wherein the matrix further comprises a block representing a direct channel response, wherein the direct channel response is associated to a channel for carrying the transmission between the first and second radio node.

15. The first radio node of claim 11, wherein the quantization scheme is based on Grassmann manifold quantization.

16. The first radio node of claim 11, wherein the respective cross-channel response is defined as being a reciprocal cross-channel response.

17. The first radio node of claim 11, wherein the first code-book index relates to a first code-book and the second code-book index relates to a second code book.

18. The first radio node of claim 11, wherein the first radio node is a radio network node or a radio base station.

19. The first radio node of claim 11, wherein the second radio node is a user equipment.

20. The first radio node of claim 11, wherein the central unit is co-located with the first radio node or with a fourth radio node.

* * * * *